July 25, 1950        J. F. COYNE        2,516,554

BLIND FASTENER DEVICE

Filed Jan. 22, 1945        2 Sheets-Sheet 1

Inventor
John F. Coyne
by
Atty.

July 25, 1950 — J. F. COYNE — 2,516,554
BLIND FASTENER DEVICE
Filed Jan. 22, 1945 — 2 Sheets-Sheet 2

Inventor
John F. Coyne
By [signature]
Atty.

Patented July 25, 1950

2,516,554

UNITED STATES PATENT OFFICE 2,516,554

BLIND FASTENER DEVICE

John Francis Coyne, Abbotsford, Melbourne, Victoria, Australia

Application January 22, 1945, Serial No. 573,943
In Australia May 23, 1944

3 Claims. (Cl. 85—2.4)

This invention relates to blind fastener devices of the kind embodying a screw and nut or the equivalent and has especial reference to devices of that character for use in what may be termed "blind locations," e. g. where one of the parts or objects to be fastened is either inaccessible or difficult of access.

The invention provides a blind fastening device, which is adapted to be inserted into operative position from one side of the parts to be assembled, and to be tightened to form a secure fastening from the same side at which the parts have been so inserted. It will therefore be apparent that the improved devices eliminate the necessity for gaining access to the rear of the parts to be fastened in order to hold any internal or inserted member of the device while the fastener is being tightened.

Fastening devices according to the invention are capable of many and varied applications, including, for instance, the securing together of two or more sheet metal parts, the attaching of handles, brackets and fittings to doors, drawers, or sheet metal panels, the attachment of instruments to instrument panels of motor vehicles, and aircraft, the mounting of parts on radio receivers, chassis, and so on.

The application of the fastening devices is not limited to sheet metal, but may extend to wood, plastics, brickwork, masonry, or fibro-cement sheets and the like.

Referring to the drawings, which illustrate preferred constructions—

Like parts are denoted by the same references throughout the drawings.

Figure 1:
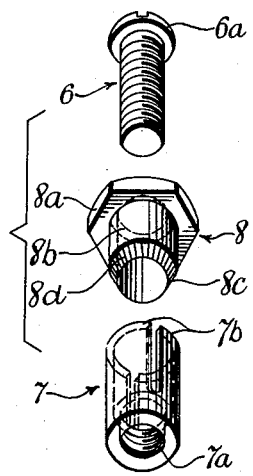
Figure 1 is an exploded perspective view of the three parts which constitute a fastener, according to one embodiment of the invention.
Figure 2:
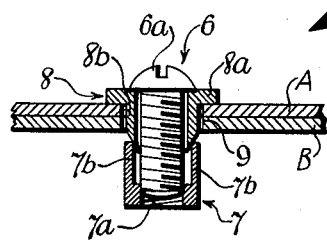
Figure 2 is a sectional view of the fastener inserted into operative position and ready for tightening.
Figure 3:
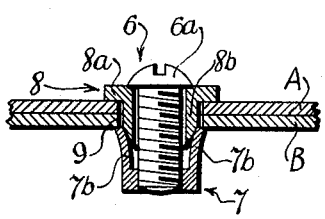
Figure 3 is a sectional view of the fastener in its operative position after tightening.

A fastener according to the embodiment of Figures 1 to 6 comprises three parts, namely, a screw having a threaded shank 6, a nut 7 and a sleeve member 8 which freely encircles the screw between the head 6a of the screw and the nut 7.

The threaded shank 6 may be of any conventional or suitable form and may have a driving slot in its head. The shank is shown screw threaded for its entire length but it would be sufficient for only the outer end portion to be threaded.

The sleeve member 8 may have a hexagonal, castellated or other suitable head 8a which bears against the under-surface of the screw head 6a. The sleeve member 8 has a skirt portion 8b depending from its head and the free end of this skirt is preferably bevelled at an appropriate angle as at 8c for a purpose that will be hereinafter apparent.

The nut member 7 may be of cylindrical form, its external diameter being the same, or approximately the same, as the external diameter of the sleeve skirt 8b. The inner portion of the nut member is screw threaded as indicated at 7a but its outer portion, which is of greater internal diameter than the screw, is devoid of screw threads and is slotted or split longitudinally from its outer extremity so as to form a plurality of jaws 7b which are capable of being deflected outwardly from a true axial plane.

The free edges of these tongues or jaws 7b may be rounded or bevelled in order to co-operate with the bevelled edge 8c of the sleeve skirt.

In use, the complete assembly, comprising the screwed shank 6, the nut 7 and the sleeve member 8, is inserted through co-aligned holes 9 in parts A and B to be joined, the insertion being made through the outer or exposed surface of the two parts. The hexagon or other head 8a of the sleeve member, as well as the head 6a of the screw, do not, of course, pass through the holes but remain at the outer surface of the parts to be joined as in Figures 2 and 3. The head 8a of the sleeve may then be gripped by a spanner or the like to prevent rotation of the sleeve 8 while the screw 6 is being turned by means of a screw driver or other appropriate tool. Such turning of the screw causes the nut member 7 to travel inwardly from the bottom or be drawn up so that the jaws 7b are spread outwardly and ride over the bevelled lower edge 8c of the sleeve skirt whereby the extremities of the jaws are forced into clamping contact with the inner surface of the inner-most plate B. In this manner a very secure fastening is obtained with the utmost ease and convenience and without requiring access to the nut.

If desired the nut member 7 may be composed of spring steel or other appropriate material so that jaws will return to the original positions, thus enabling the fastener to be released, removed and replaced through the holes 9 and retightened whenever so desired. Furthermore, the outer portion of the nut member 7 may be split longitudinally from its outer edge in numerous places as in Figure 6 so as to provide any desired number of jaws according to the degree of springiness required.

The bevelled edge of the sleeve 8 may be knurled, scored or provided with other such formation, as at 8d which will increase friction or establish a grip between it and the jaws 7b so as to oppose turning of the nut in relation to the sleeve when the fastener is being tightened.

The design and dimensions of the parts should be such that there will be no possibility of the jaws 7b entering the hole in the inner plate B or like part. At the same time it is desirable that the jaws should not be spared too much out of the axial plane for the reason that the security of the fastening is due primarily to such jaws being under lengthwise compression.

It is to be understood that the various parts of the device may be suitably modified according to circumstances. For instance, the head of the screw 6 may be in the form of a bolt head or it may have a hook or other suitable formation extending outwardly therefrom. Alternatively, a screw threaded shank may extend outwardly from the head of the screw, for receiving an ordinary nut or for passing into a threaded hole in another member.

Figure 4:
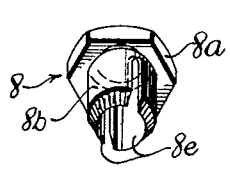
Figure 4 is a perspective view of a modified sleeve member.
Figure 6:
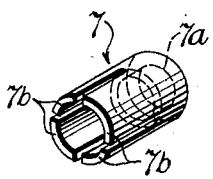
Figure 6 is a perspective view of a modified nut member.
Figure 5:
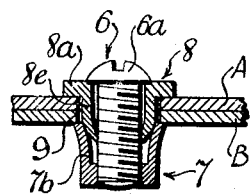
Figure 5 is a sectional view illustrating how the modified sleeve of Figure 4 binds upon and becomes locked to the screw member upon tightening of the fastener.

The skirt portion 8b of the sleeve member 8 may be slotted or split as indicated in Figures 4 and 5 to provide jaws 8e, which when the nut member 7 is being drawn over the sleeve member, will be forced inwards to grip the screw 6 as in Figure 5 thereby providing a more positive locking of the complete fastener.

Figure 7:
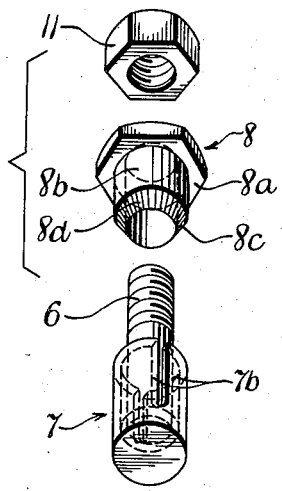
Figure 7 is a perspective view of the parts of a fastener according to another embodiment of the invention.
Figure 8:
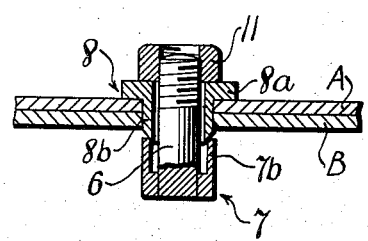
Figure 8 is a sectional view showing the fastener of Figure 7, inserted into operative position and ready for tightening.
Figure 9:
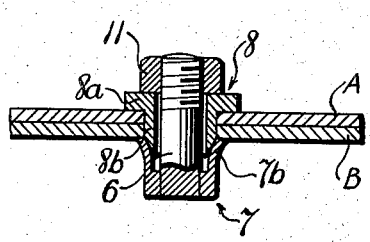
Figure 9 is a sectional view showing the fastener as tightened.

Referring now to Figures 7, 8, 9, only the upper end portion of shank 6 need be screwed and this is done to receive a nut 11 which is adapted to bear down upon the upper face of the sleeve head 8a. In this embodiment, the member 7 having the jaws 7b is made fast, in any suitable manner, to the inner end of shank 6. The operation and fastening action will be clear from Figures 8 and 9. Thus, when the nut 11 is turned around the screwed shank 6, while the sleeve 8 is held against rotation, the jawed member will be caused to move (with the shank) towards the sleeve so that the free ends of the jaws will be spread slightly outwards and travel lengthwise along the sleeve until they eventually are forced into tight engagement with the under-surface of part B.

In all embodiments it is preferred that the sleeve should be a neat or close fit within the holes in the parts A, B, as the fastener will thereby have high shear resistance and the stability and security of the fastening will be increased.

Having now described my invention, what I claim as new and desire to secure by Letters Patent is:

1. A blind fastener device comprising a threaded shank, a sleeve freely encircling the shank towards its outer end, said sleeve having an enlarged flange head at its outer end open at the bore of the sleeve and a skirt portion with an inwardly tapered inner end, and a spring metal tubular member of uniform external diameter approximately the same as the sleeve skirt engaged on the inner end portion of the shank and having a relatively long uniformly and considerably enlarged freely open and unobstructed outer bore portion of an internal diameter considerably greater than the diameter of the shank and less than the normal external diameter of the sleeve skirt to reduce the thickness of the wall outwardly thereof and split longitudinally substantially the length of the enlarged outer bore portion to form a plurality of relatively thin spring jaws therebetween of a length which results in minimum deflection thereof from the axial plane and automatic return to normal position when released, the free ends of said jaws abutting said tapered end spaced entirely outwardly of the sleeve bore when the comprised parts are assembled for insertion and inserted through registering holes in parts to be fastened together, with the flange head bearing against the exposed surface of the outer of said parts, the outer end of the shank being accessible from said surface, and an enlarged member on the outer end of the shank against said flange head, said shank having threaded connection with one of said members whereby upon turning said one member and shank relatively in one direction while holding the sleeve against turning, the tubular member and sleeve will be drawn together to cause the spring jaws to spread only slightly outwardly at their free ends while constantly bearing on and riding against the tapered end of the sleeve skirt and only the extremities of the jaws forced into lengthwise compression engagement with the inner surface of the innermost part immediately adjacent the sleeve skirt while maintaining contact with the tapered end thereof without entering within the sleeve or weakening the jaws whereby the spring jaws will automatically return to normal position upon turning said one member and shank relatively in a reverse direction to release the fastener for removal, replacement and retightening, whenever desired.

2. A blind fastener device comprising a threaded shank, a sleeve freely encircling the shank towards its outer end, said sleeve having an enlarged flange head at its outer end open at the bore of the sleeve and a skirt portion with an inwardly tapered inner end, and a spring metal tubular member of uniform external diameter approximately the same as the sleeve skirt engaged on the inner end portion of the shank and having a relatively long uniformly and considerably enlarged freely open and unobstructed outer bore portion of an internal diameter considerably greater than the diameter of the shank and less than the normal external diameter of the sleeve skirt to reduce the thickness of the wall outwardly thereof and split longitudinally substantially the length of the enlarged outer bore portion to form a plurality of relatively thin spring jaws therebetween of a length which results in minimum deflection thereof from the axial plane and automatic return to normal position when released, the free ends of said jaws abutting said tapered end spaced entirely outwardly of the sleeve bore when the comprised parts are assembled for insertion and inserted through registering holes in parts to be fastened together, with the flange head bearing against the exposed surface of the outer of said ports, the outer end of the shank being accessible from said surface, and an enlarged tool engaging member, fixed on the outer end of the shank, against said flange head, the inner bore portion of the tubular member being threaded on the inner end portion of the shank, whereby upon turning the shank by said tool engaging member while holding the sleeve against turning, the tubular member and sleeve will be drawn together to cause the spring jaws to spread only slightly outwardly at their free ends while constantly bearing on and riding against the tapered end of the sleeve skirt and only the extremities of the jaws forced into lengthwise compression engagement with the inner surface of the innermost part immediately adjacent the sleeve skirt while maintaining contact with the tapered end thereof without entering within the sleeve or weakening the jaws whereby the spring jaws will automatically return to normal position upon turning said one member and shank relatively in a reverse direction to release the fastener for removal, replacement and retightening, whenever desired.

3. A blind fastener device comprising a threaded shank, a sleeve freely encircling the shank towards its outer end, said sleeve having an enlarged flange head at its outer end open at the bore of the sleeve and a skirt portion with an inwardly tapered inner end, and a spring metal tubular member of uniform external diameter approximately the same as the sleeve skirt engaged on the inner end portion of the shank and having a relatively long uniformly and considerably enlarged freely open and unobstructed outer bore portion of an internal diameter considerably greater than the diameter of the shank and less than the normal external diameter of the sleeve skirt to reduce the thickness of the wall outwardly thereof and split longitudinally substantially the length of the enlarged outer bore portion to form a plurality of relatively thin spring jaws therebetween of a length which results in minimum deflection thereof from the axial plane and automatic return to normal position when released, the free ends of said jaws abutting said tapered end spaced entirely outwardly of the sleeve bore when the comprised parts are assembled for insertion and inserted through registering holes in parts to be fastened together, with the flange head bearing against the exposed surface of the outer of said ports, the outer end of the shank being accessible from said surface, and an enlarged tool engaging member threaded on the outer end of the shank against the flange head, the inner bore portion of the tubular member being fixed on the inner end portion of the shank, whereby upon turning said tool engaging member on the shank while holding the sleeve against turning, the tubular member and sleeve will be drawn together to cause the spring jaws to spread only slightly outwardly at their free ends while constantly bearing on and riding against the tapered end of the sleeve skirt and only the extremities of the jaws forced into lengthwise compression engagement with the inner surface of the innermost part immediately adjacent the sleeve skirt while maintaining contact with the tapered end thereof without entering within the sleeve or weakening the jaws whereby the spring jaws will automatically return to normal position upon turning said one member and shank relatively in a reverse direction to release the fastener for removal, replacement and retightening, whenever desired.

JOHN FRANCIS COYNE.

REFERENCES CITED

The following references are of record in the file of this patent:

UNITED STATES PATENTS

| Number | Name | Date |
| --- | --- | --- |
| 2,282,711 | Eklund | May 12, 1942 |
| 2,296,470 | Keehn | Sept. 22, 1942 |
| 2,343,283 | Davis | Mar. 7, 1944 |
| 2,392,491 | Moran | Jan. 8, 1946 |
| 2,403,330 | Benton | July 2, 1946 |

FOREIGN PATENTS

| Number | Country | Date |
| --- | --- | --- |
| 436,238 | Great Britain | Oct. 8, 1935 |